United States Patent
Huang et al.

(10) Patent No.: US 11,803,459 B2
(45) Date of Patent: Oct. 31, 2023

(54) LATENCY TOLERANCE REPORTING VALUE DETERMINATIONS

(71) Applicant: Hewlett-Packard Development Company, L.P., Spring, TX (US)

(72) Inventors: Tsue-Yi Huang, New Taipei (TW); Kang-Ning Feng, New Taipei (TW); Ming-Chang Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 3 days.

(21) Appl. No.: 17/505,184

(22) Filed: Oct. 19, 2021

(65) Prior Publication Data
US 2023/0118047 A1 Apr. 20, 2023

(51) Int. Cl.
| | |
|---|---|
| *G06F 11/27* | (2006.01) |
| *G06F 11/34* | (2006.01) |
| *G06F 11/22* | (2006.01) |
| *G06N 20/00* | (2019.01) |
| *G06F 11/277* | (2006.01) |

(52) U.S. Cl.
CPC ...... *G06F 11/3423* (2013.01); *G06F 11/2221* (2013.01); *G06F 11/2268* (2013.01); *G06F 11/277* (2013.01); *G06N 20/00* (2019.01)

(58) Field of Classification Search
CPC ............. G06F 11/2221; G06F 11/2268; G06F 11/277; G06F 11/3423
See application file for complete search history.

(56) References Cited

U.S. PATENT DOCUMENTS

| | | | |
|---|---|---|---|
| 8,560,749 B2 | 10/2013 | Wang | |
| 2013/0343250 A1* | 12/2013 | Homchaudhuri | H04W 52/0251 370/311 |
| 2014/0082242 A1* | 3/2014 | Murphy | G06F 13/24 710/263 |
| 2014/0189385 A1* | 7/2014 | Gorbatov | G06F 1/3234 713/320 |
| 2015/0052404 A1 | 2/2015 | Henriques | |
| 2016/0381638 A1 | 12/2016 | Min et al. | |
| 2017/0344507 A1* | 11/2017 | Chen | G06F 13/4081 |
| 2020/0258591 A1* | 8/2020 | Chaiken | G11C 7/04 |
| 2020/0358685 A1* | 11/2020 | Gupta | G06F 1/3215 |
| 2021/0064388 A1* | 3/2021 | Gardner | G06N 20/00 |
| 2021/0067451 A1* | 3/2021 | Duenas | G06F 13/385 |
| 2021/0149472 A1 | 5/2021 | Lake | |
| 2022/0100683 A1* | 3/2022 | Thiruchengode Vajravel | G06F 13/18 |
| 2022/0207434 A1* | 6/2022 | Xue | G06N 5/01 |

OTHER PUBLICATIONS

How to Improve Accuracy of Machine Learning Model? by Cogito published by cogitotech.com Aug. 18, 2019 https://www.cogitotech.com/blog/how-to-improve-accuracy-of-machine-learning-model (Year: 2019).*

* cited by examiner

*Primary Examiner* — Joseph O Schell
(74) *Attorney, Agent, or Firm* — Knobbe, Martens, Olson & Bear, LLP (57) ABSTRACT

Examples of electronic devices are described herein. In some examples, an electronic device may include a communication interface to receive information from a peripheral device. In some examples, the electronic device may include logic circuitry to determine a target latency tolerance reporting (LTR) value based on the information via a machine learning model.

13 Claims, 7 Drawing Sheets

LATENCY TOLERANCE REPORTING VALUE DETERMINATIONS

BACKGROUND

The use of electronic devices has expanded. A computing device is a kind of electronic device that includes electronic circuitry for performing processing. As processing capabilities have expanded, computing devices have been utilized to perform more functions. For example, a variety of computing devices are used for work, communication, and entertainment. Computing devices may be linked to other devices and may communicate with other devices.

DETAILED DESCRIPTION

An electronic device is a device that includes electronic circuitry (e.g., integrated circuitry, a chip(s), etc.). Examples of electronic devices include docking devices, display devices, computing devices, smartphones, tablet devices, game consoles, etc. Some examples of electronic devices may utilize circuitry (e.g., controller(s), processor(s), or a combination thereof, etc.) to perform an operation or operations. In some examples, electronic devices may execute instructions stored in memory to perform the operation(s). Instructions may be code, programming, or a combination thereof that specifies functionality or operation of the circuitry. In some examples, instructions may be stored in memory (e.g., Read-Only Memory (ROM), Erasable Programmable Read-Only Memory (EPROM), Electrically Erasable Programmable Read-Only Memory (EEPROM), flash memory, dynamic random access memory (DRAM), synchronous DRAM (SDRAM), magnetoresistive random-access memory (MRAM), phase-change random-access memory (PCRAM), hard disk drive (HDD), solid state drive (SSD), optical drive, etc.). In some examples, different circuitries in an electronic device may store separate instructions, utilize separate instructions for operation, or a combination thereof.

In some examples, an electronic device may be linked to another electronic device or devices using a wired link. For example, an electronic device (e.g., computing device, etc.) may include a wired communication interface (e.g., port(s), interface circuitry(ies), etc.) for connecting peripheral device(s). Examples of wired interfaces include a DisplayPort™ (DP) interface, High-Definition Multimedia Interface (HDMI®) interface, Universal Serial Bus (USB) interface (e.g., USB Type-C (USB-C) interface), Lightning® interface, Digital Visual Interface (DVI) interface, Ethernet interface, Thunderbolt™ interface, etc.

A link between electronic devices may be a direct link (e.g., without an intervening device) or an indirect link (e.g., with an intervening device or devices). For instance, a link may be established between electronic devices over a network using a docking device(s), hub(s), repeater(s), splitter(s), router(s), switch(es), or a combination thereof, etc.

A peripheral device is an electronic device to be linked to a host device and/or to provide auxiliary functionality relative to the host device. In some examples, a peripheral device may be an accessory to a host device. Examples of peripheral devices include mice, keyboards, headsets, cameras, monitors, stylus pads, microphones, controllers, remote controls, external storage devices, etc. A host device is a computing device that allows linking with a peripheral device or devices. Examples of host devices include desktop computers, laptop computers, servers, smartphones, tablet devices, etc. In some examples, the term "peripheral device" may exclude host devices.

In some examples, a peripheral device is linked to a host device with a wired connection. For example, a peripheral device may be linked to a host device via a USB, Lightning, HDMI, DisplayPort, etc., connection. In some examples, a peripheral device may provide input to the host device. For instance, a peripheral device may provide detected input (e.g., directional movement, click events, button events, button presses, motion input, taps, contact locations, audio, etc.). In some examples, a peripheral device may present host device outputs. For instance, a peripheral device may output images (e.g., graphics, video, etc.) provided by a host device, audio provided by a host device, etc.

To communicate with a peripheral device, a host device may utilize a Latency Tolerance Reporting (LTR) value. An LTR value is a value indicating a period to respond to a peripheral device. For instance, when a read or write (read/write) procedure is triggered, a processor (e.g., central processing unit (CPU)) of a host device may attempt to respond within the period indicated by the LTR value. In a case that the processor responds within the period indicated by the LTR value, the read/write procedure may succeed (e.g., "pass"). In a case that the processor does not respond within the period indicated by the LTR value, the read/write procedure may fail.

Power consumption, performance, or a combination thereof may vary based on the LTR value utilized. For instance, shorter LTR values may permit increased performance at a cost of increased power consumption, while longer LTR values may reduce power consumption at a cost of decreased performance. Adjusting an LTR value may be performed to reduce power consumption by allowing a host (e.g., CPU) to decide how long to wait before servicing an input/output (I/O) interrupt from a peripheral device. Longer LTR values may cause a CPU to enter a sleep state frequently during a series of I/O operations. Performance may be impacted due to a delay for a CPU to resume operation from the sleep state.

In some examples, respective LTR values may be utilized for respective controllers, ports, or a combination thereof. For instance, an LTR value may be utilized for respective ports (e.g., root ports) for a Peripheral Component Interconnect Express (PCIe) interface of a host device. The PCIe interface is one example of an interface that may be utilized for communication with a component or components (e.g., motherboard) of an electronic device. In some examples, a host device may include a peripheral device controller(s). A peripheral device controller is circuitry to control interoperation with a peripheral device. Some examples of a peripheral device controller may include a Thunderbolt controller, audio controller, local area network (LAN) controller, USB controller, storage controller, etc. In some examples, a peripheral device controller may have a register(s) to store an LTR value. In some examples, the register(s) may be programmed by a basic input/output system (BIOS) of a host device during a boot procedure. When a high-speed peripheral device is linked to the host device (directly or through a docking device, for instance), if the LTR value of the corresponding peripheral device controller is too large for the peripheral device, a performance issue may occur. For instance, the peripheral device may expect a response from the processor (e.g., CPU) within a time "t," but an LTR value may indicate a period that is larger than "t." However, if the LTR value is too small, increased power consumption may occur, which may more quickly discharge a battery or waste power resources.

Some examples of the techniques described herein may be utilized to select, control, or adjust an LTR value. For instance, some examples of the techniques described herein may utilize machine learning to determine an LTR value. Machine learning is a technique where a machine learning model may be trained to perform a task based on a set of examples (e.g., data). For instance, a machine learning model may be trained to classify an LTR value as likely to pass or likely to fail. Training a machine learning model may include determining a weight or weights of the machine learning model.

Throughout the drawings, similar reference numbers may designate similar or identical elements. When an element is referred to without a reference number, this may refer to the element generally, without limitation to any particular drawing or figure. In some examples, the drawings are not to scale and the size of some parts may be exaggerated to more clearly illustrate the example shown. Moreover, the drawings provide examples in accordance with the description. However, the description is not limited to the examples provided in the drawings.

Figure 1:
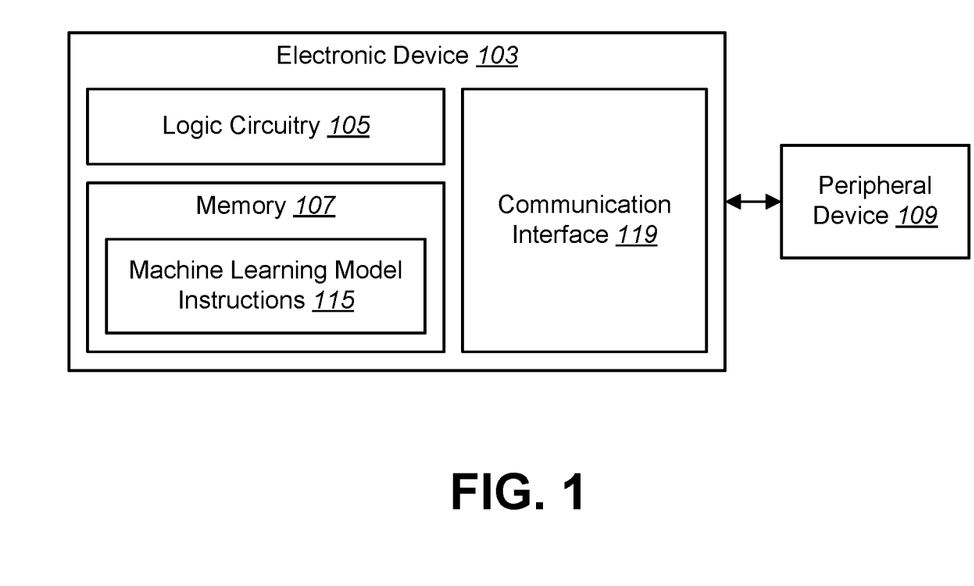
FIG. 1 is a block diagram of an example of an electronic device that may be used in latency tolerance reporting (LTR) value determinations.

FIG. 1 is a block diagram of an example of an electronic device 103 that may be used in latency tolerance reporting value determinations. The electronic device 103 may be an electronic device, such as a personal computer, a desktop computer, a laptop computer, a game console, a host device, etc. The electronic device 103 may include logic circuitry 105, a memory 107, and a communication interface 119. The electronic device 103 may include an additional component(s) (not shown), some of the components described herein may be removed or modified, or a combination thereof without departing from the scope of this disclosure.

The communication interface 119 is circuitry to communicate with an external device or devices (e.g., peripheral device 109). An example of the communication interface 119 may be a USB (e.g., USB-C) interface. In some examples, the electronic device 103 may be in communication with (e.g., coupled to, have a communication link with) a peripheral device 109 via the communication interface 119. For example, the electronic device 103 may be connected to the peripheral device 109 with a cable or cables (e.g., USB cable(s)). Examples of the peripheral device 109 may include a docking device, mouse, keyboard, headset, camera, monitor, stylus pad, microphone, controller, remote control, external storage device, etc.

The electronic device 103 (e.g., communication interface 119) may be connected to the peripheral device 109. For instance, the electronic device 103 may be connected to the peripheral device 109 via a connector(s), port(s), cable(s), etc. The communication interface 119 may receive information from the peripheral device 109. The information may indicate an aspect or aspects of the peripheral device 109. For instance, the information may indicate a vendor identifier (e.g., data indicating a manufacturer of the peripheral device 109), device identifier (e.g., data indicating a type of device, model number, version number, stock keeping unit (SKU) number, etc.), requested LTR, other information, or a combination thereof. In some examples, the peripheral device 109 may be a docking device that is connected to another peripheral device(s). In some examples, the electronic device 103 is connected to a docking device and the docking device is connected to the peripheral device 109. In some examples, the docking device may send information (e.g., a table) for each peripheral device connected to the docking device. For instance, the docking device may include circuitry, ports, or a combination thereof to interface with peripheral devices. The docking device may send information to the electronic device 103 indicating whether each port is connected to a peripheral device, information corresponding to each connected peripheral device, or a combination thereof.

The logic circuitry 105 is an electronic circuit to execute an instruction or instructions. The logic circuitry 105 may be any of a processor, central processing unit (CPU), a digital signal processor (DSP), a semiconductor-based microprocessor, graphics processing unit (GPU), field-programmable gate array (FPGA), an application-specific integrated circuit (ASIC), other hardware device, or a combination thereof suitable for retrieval and execution of instructions stored in the memory 107. In some examples, the logic circuitry 105 may include multiple processors (e.g., a CPU and a GPU). The logic circuitry 105 may fetch and execute instructions stored in the memory 107. In some examples, the logic circuitry 105 may include an electronic circuit or circuits that include electronic components for performing a function or functions of the instructions.

The memory 107 is electronic circuitry to store data. The memory 107 may be any electronic, magnetic, optical, or other physical storage device that contains or stores electronic data (e.g., instructions, information, or a combination thereof). The memory 107 may be, for example, Random Access Memory (RAM), Electrically Erasable Programmable Read-Only Memory (EEPROM), a storage device, an optical disc, or a combination thereof. In some examples, the memory 107 may be volatile memory, non-volatile memory, or a combination thereof, such as Dynamic Random Access Memory (DRAM), EEPROM, magnetoresistive random-access memory (MRAM), phase change RAM (PCRAM), memristor, flash memory, or a combination thereof. In some examples, the memory 107 may be a non-transitory tangible machine-readable storage medium, where the term "non-transitory" does not encompass transitory propagating signals. In some examples, the memory 107 may include multiple devices (e.g., a RAM card and a solid-state drive (SSD)).

In some examples, the memory 107 stores machine learning model instructions 115. The machine learning model instructions 115 are instructions to execute a machine learning model, train a machine learning model, or a combination thereof. In some examples, the machine learning model instructions 115 may be a machine learning model driver. Examples of the machine learning model may include a logistic regression model, multilayer perceptron model, decision tree model, support vector machine (SVM) model, etc. In some examples, the machine learning model is a classification model to classify whether an LTR value passes or fails (e.g., whether utilizing an LTR value will result in a passing or failing operation (e.g., communication, read operation, write operation, interrupt response, etc.) with the peripheral device 109).

In some examples, the logic circuitry 105 determines a target LTR value based on the information via the machine learning model. A target LTR value is an LTR value that is a candidate for use in an LTR setting (for a peripheral device controller and/or peripheral device, for example). For instance, the logic circuitry 105 may execute the machine learning model instructions 115 to determine a target LTR value corresponding to the peripheral device 109 identified by the information.

In some examples, the machine learning model may be a logistic regression model in accordance with Equation (1).

$$g_{w,b}(x) = \sigma\left(\sum_i w_i x_i + b\right), \quad (1)$$

$$f(x) = \begin{cases} \text{Fail, if } g_{w,b}(x) < 0.5 \\ \text{Pass, if } g_{w,b}(x) \geq 0.5 \end{cases}$$

In Equation (1), g denotes a function of the machine learning model, w is a weight, b is a constant, σ is a function that maps an input to a value between 0 and 1, i is an index, f is a boundary function (e.g., line, hyperplane, etc.), and x denotes an LTR value. In some examples, the machine learning model may take an LTR (e.g., x) as an input and may produce an output (e.g., y) denoting whether the LTR value passes or fails. In some examples, the machine learning model may be utilized to determine a binary classification function. The binary classification function may be utilized to classify an LTR value as pass or fail, for instance.

In some examples, the logic circuitry 105 may train the machine learning model. For example, the logic circuitry 105 may utilize a training dataset to train the machine learning model. A training dataset is data to train a machine learning model. In some examples, the training dataset includes a set of training inputs (e.g., X) and a set of training outputs (e.g., Y). For instance, a training dataset may be denoted $\{(X^1, Y^1), (X^2, Y^2), \ldots (X^n, Y^n)\}$, where n denotes a quantity of training inputs (e.g., training LTR values) and training outputs (e.g., pass or fail labels). In some examples, the logic circuitry 105 may generate a training dataset, receive a training dataset, or a combination thereof. For example, the logic circuitry 105 may generate a set of training inputs as a set of training LTR values that vary (e.g., ±5%, ±7.5%, ±10%, ±15%, ±18%, ±20%, etc.) from a default LTR value (e.g., LTR value stored in a register of a controller for the peripheral device 109 or a requested LTR value (e.g., LTR value sent to the electronic device 103 from the peripheral device 109). In some examples, the logic circuitry 105 may generate a set of training outputs (e.g., pass or fail labels, etc.) by triggering a command (e.g., read command, write command, read/write command, another command(s), etc.) for a plurality of training LTR values and detecting whether the command passed or failed. Each training LTR value may be labeled with a corresponding pass or fail. For example, if a command at a training LTR value is successful (e.g., successful read, successful write, etc.), the training LTR value may be associated with a passing indicator. Otherwise, the training LTR value may be associated with a failure indicator. In some examples, the logic circuitry 105 may send a read/write command corresponding to the peripheral device 109 for a plurality of training LTR value to produce a training dataset. Examples of a passing case and a failure case are given in FIG. 2A and FIG. 2B. In some examples, a failure case may be detected based on an operation timeout, a detected dropped packet, etc.

In some examples, the logic circuitry 105 may train the machine learning model in accordance with the loss function L of Equation (2).

$$L(f) = \Sigma_n \delta(f(x^n) \neq Y^n) \quad (2)$$

In Equation (2), δ(express) is a function that returns 1 if express is true or returns 0 if express is false. The loss function L may be utilized to evaluate the boundary function. For instance, the weights of the machine learning model function may be adjusted to reduce (e.g., minimize) the loss of the boundary function (e.g., reduce or minimize L(f)). The boundary function may be utilized to classify LTR values as passing or failing.

In some examples, a machine learning model may utilize another parameter or parameters. For example, a user may exhibit a behavior pattern while using a computing device. For instance, a user may often conduct a meeting with a camera and headset in some time slots, may watch streaming video after work, etc. In some examples, time may be utilized as a parameter (e.g., additional parameter) for the machine learning model. In some examples, the logic circuitry 105 may execute the machine learning model instructions 115 in the background (e.g., a machine learning model driver (e.g., training driver) may run in the background) and produce the training dataset by sending read/write commands with different LTR values at different times. In some examples, the machine learning model inputs may include X as an input vector (e.g., $X_i$=(LTR value, time), where $X_i[0]$=LTR value and $X_i[1]$=time). In some examples, the electronic device 103 (e.g., logic circuitry 105, machine learning model driver, BIOS, or a combination thereof) may calculate a target LTR value before (e.g., in a time period before, immediately before, etc.) a read/write operation. In some examples, the memory 107 (e.g., a record in memory, a database in memory, etc.) may store a vendor identifier, a device identifier, a machine learning model (e.g., boundary function and time), a failure count, or a combination thereof.

In some examples, the logic circuitry 105 trains the machine learning model in response to a determination that a record of the peripheral device 109 is not stored (e.g., is not stored in the memory 107). When the peripheral device 109 is first connected to the electronic device 103, for instance, the peripheral device 109 (or a docking device) sends information about the peripheral device. The logic circuitry 105 may make a determination whether the information matches any previously stored record(s). For example, the logic circuitry 105 may attempt to look up the information (e.g., vendor identifier, model identifier, other information, or a combination thereof, etc.) in a database. In some examples, the logic circuitry 105 may train the machine learning model in response to a determination that the peripheral device is not indicated in the database (e.g., a record of the device is not stored in the database, memory 107, etc.).

In some examples, the logic circuitry 105 trains the machine learning model in response to a determination that a failure count threshold is satisfied (e.g., exceeded). A failure count threshold is a threshold to trigger machine learning model training (or re-training) in a case that an operation(s) with an LTR value (e.g., target LTR value) has failed a quantity of times. For example, each time an operation (e.g., read/write operation) is attempted by the electronic device 103 or the peripheral device 109 and fails, the electronic device 103 (e.g., logic circuitry 105) may increase a failure count. For instance, the logic circuitry 105 may increase (e.g., increment) a failure count in response to a read/write failure. Examples of the failure count threshold may include 1, 2, 4, 5, 10, 30, 75, 100, 500, etc.

In some examples, to determine the target LTR value, the logic circuitry 105 may determine a plurality of passing LTR values based on the machine learning model. In some examples, the passing LTR values may be the training LTR values with passing indicators. In some examples, the logic circuitry 105 may provide a set of varying candidate LTR values to the machine learning model. In some examples, the candidate LTR values may vary (e.g., ±5%, ±7.5%, ±10%, ±15%, ±18%, ±20%, etc.) from a default LTR value (e.g., LTR value stored in a register of a controller for the peripheral device 109) or a requested LTR value (e.g., LTR value sent to the electronic device 103 from the peripheral device 109). The trained machine learning model may indicate whether each of the candidate LTR values passes or fails. The plurality of passing LTR values may be those LTR values indicated as passing by the machine learning model.

In some examples, the logic circuitry 105 may select the target LTR value from the plurality of passing LTR values. In some examples, the logic circuitry 105 may select the largest (e.g., maximum) LTR value from the plurality of passing LTR values as the target LTR value.

The electronic device 103 may include a BIOS. As used herein, a basic input/output system (BIOS) refers to hardware or hardware and instructions to initialize, control, or operate a computing device (e.g., electronic device 103) prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of a computing device.

In some examples, a BIOS may provide or establish an interface between hardware devices or platform firmware of the electronic device 103 and an OS of the electronic device 103, via which the OS of the electronic device 103 may control or operate hardware devices or platform firmware of the electronic device 103. In some examples, a BIOS may implement the Unified Extensible Firmware Interface (UEFI) specification or another specification or standard for initializing, controlling, or operating a computing device.

In some examples, the BIOS may determine whether the target LTR value is less than an LTR setting. An LTR setting is an LTR value utilized by logic circuitry (e.g., logic circuitry 105) to interoperate with a peripheral device (e.g., peripheral device 109). In some examples, an LTR setting is an LTR value indicated by (e.g., stored in) a port (e.g., platform controller hub (PCH) PCIe root port). In some examples, the BIOS may compare the target LTR value to the LTR setting to determine whether the target LTR value is less than the LTR setting. The BIOS may set an LTR value for a port in a response to determining that the target LTR value is less than the LTR setting. For instance, the BIOS may override (e.g., overwrite) the LTR setting to be the target LTR value. In some examples, if a failure count for the target LTR satisfies the failure count threshold, another (e.g., next smaller) passing LTR value may be selected as the target LTR value, the machine learning model may be retrained, or a combination of both.

Figure 2A:
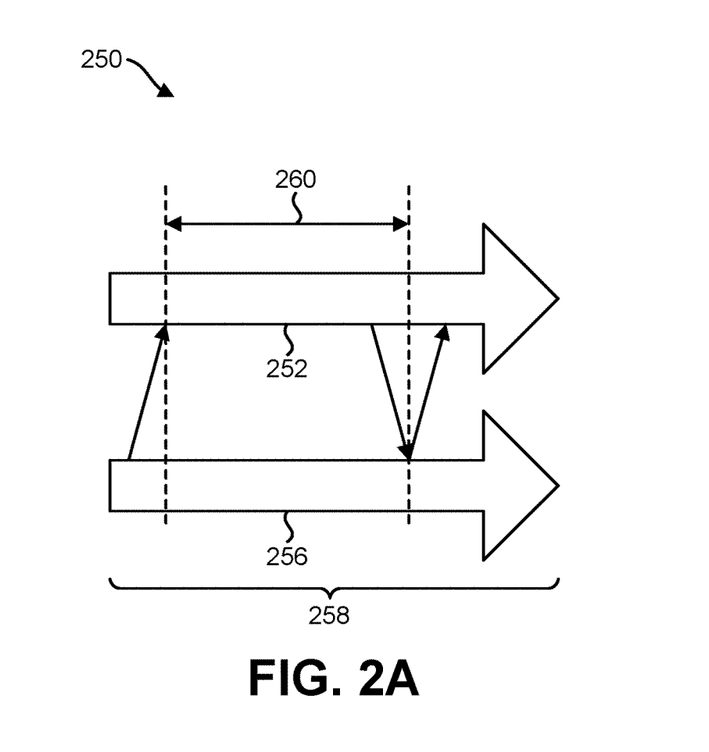
FIG. 2A is a diagram illustrating an example of a passing case for an LTR value.

FIG. 2A is a diagram illustrating an example of a passing case 250 for an LTR value. In this example, a first arrow 252 represents processor operation (e.g., host processor operation) and a second arrow 256 represents peripheral device operation. The horizontal dimension of FIG. 2A represents time. An LTR value (e.g., $Time_{LTR}$) 258 is also illustrated. In this example, the peripheral device triggers an operation (e.g., read/write operation) with the processor. As illustrated in FIG. 2A, the peripheral device receives a response to the operation trigger within a processor response time (e.g., $Time_{CPU}$) 260 from a processor scheduling time. Given that $Time_{LTR}$ is an LTR value and $Time_{CPU}$ is a processor response time (after scheduling, for instance), an LTR value may pass if ($Time_{LTR}-Time_{CPU}>0$) or may fail if ($Time_{LTR}-Time_{CPU}\leq0$). In this example, $Time_{LTR}-Time_{CPU}>0$ to produce the passing case 250.

In some examples, an electronic device (e.g., electronic device 103) may produce a training dataset by sending read/write commands with different LTR values to a peripheral device. The training dataset may be utilized to train a machine learning model (e.g., to find a boundary function f(LTR)=pass/fail) as described in FIG. 1. The machine learning model may be utilized to determine a target LTR value, which may be stored in memory.

Figure 2B:
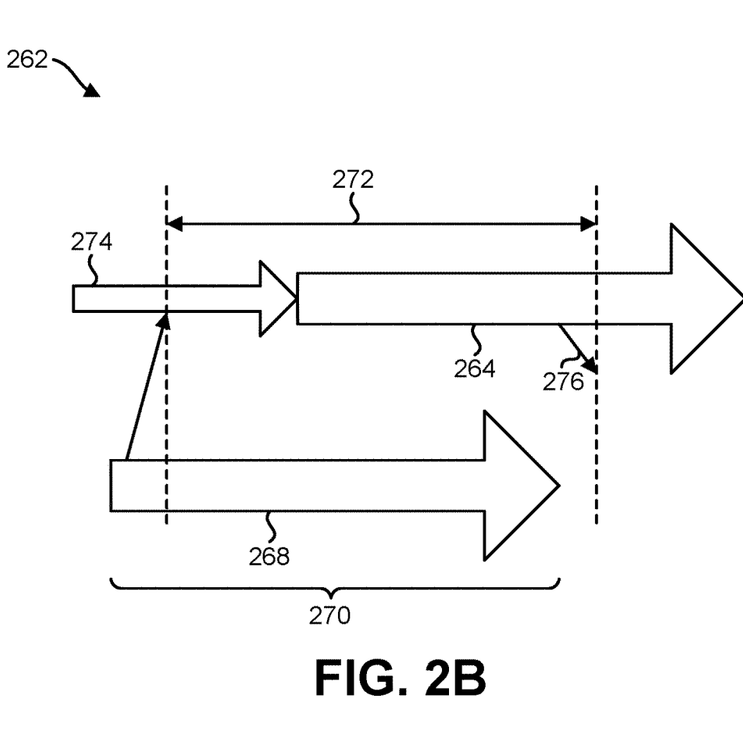
FIG. 2B is a diagram illustrating an example of a failure case for an LTR value.

FIG. 2B is a diagram illustrating an example of a failure case 262 for an LTR value. In this example, a first arrow 264 represents processor operation (e.g., host processor operation) and a second arrow 268 represents peripheral device operation. The horizontal dimension of FIG. 2B represents time. An LTR value (e.g., $Time_{LTR}$) 270 is also illustrated. In this example, the peripheral device triggers an operation (e.g., read/write operation) with the processor. As illustrated in FIG. 2B, the peripheral device receives a response 276 to the operation trigger within a processor response time (e.g., $Time_{CPU}$) 272 after a processor scheduling time. In the example of FIG. 2B, the processor is initially idle as represented by a third arrow 274. As indicated by the third arrow 274, the processor may transition from an idle state to an active state. Due to the transition delay, a response 276 from the processor does not occur until after the LTR value 270 is passed. In this example, $Time_{LTR}-Time_{CPU}\leq0$ to produce the failure case 262.

Figure 3:
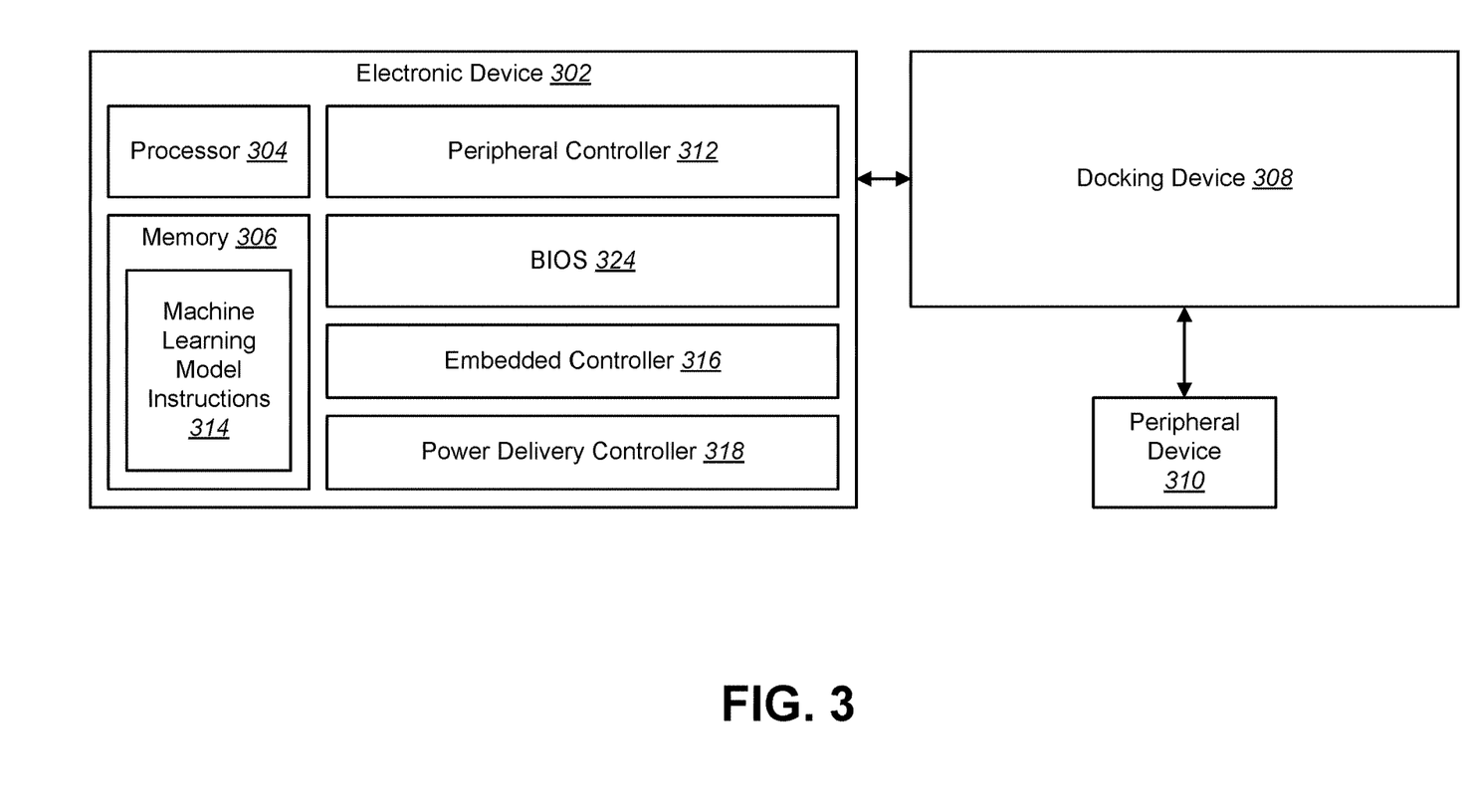
FIG. 3 is a block diagram of an example of an electronic device that may be used in latency tolerance reporting value determination.

FIG. 3 is a block diagram of an example of an electronic device 302 that may be used in latency tolerance reporting value determination. The electronic device 302 may be an example of the electronic device 103 described in FIG. 1. In this example, the electronic device 302 includes a processor 304, a memory 306, a peripheral controller 312 (e.g., a peripheral device controller), a BIOS 324, an embedded controller 316, and a power delivery controller 318. The electronic device 302 may include an additional component(s) (not shown), some of the components described herein may be removed or modified, or a combination thereof without departing from the scope of this disclosure. In some examples, the BIOS 324, the embedded controller 316, the power delivery controller 318, the processor 304, or a combination thereof may perform an operation or operations described in FIG. 1, FIG. 2A, FIG. 2B, FIG. 3, FIG. 4, FIG. 5, FIG. 6, FIG. 7, or a combination thereof.

The power delivery controller 318 is circuitry to interface with another device. In some examples, the power delivery controller 318 may be an example of the communication interface 119 described in FIG. 1, may be included in a communication interface, or a combination thereof. For instance, the power delivery controller 318 may be connected to a docking device 308 by a cable. In some examples, the power delivery controller 318 may control power delivery via an interface. In some examples, the power delivery controller 318 and the docking device 308 may communicate using a USB (e.g., USB-C) interface.

In some examples, the power delivery controller 318 may receive information about a peripheral device 310 from the docking device 308. For instance, the power delivery controller 318 may receive information as described in FIG. 1. For instance, the power delivery controller 318 may receive a Vendor-Defined Message (VDM) indicating information (e.g., vendor identifier, device identifier, etc.) about the peripheral device 310.

In some examples, the power delivery controller 318 may send the information to the embedded controller 316. The embedded controller 316 is circuitry that controls a function or functions of the electronic device 302. For instance, the embedded controller 316 may control an aspect(s) of motherboard functionality on the electronic device 302. The embedded controller 316 may send the information to the BIOS 324. In some examples, the BIOS 324 may send the information to memory (e.g., memory 306) for storage (and/or for access by a machine learning model driver, for instance). In some examples, the BIOS 324 may utilize the information to set a register(s) (e.g., LTR register(s)) of a peripheral device controller(s) (e.g., PCIe controller(s)). For instance, the BIOS 324 may set a register of a PCIe controller, where the processor 304 may react to (e.g., operate in accordance with) the new LTR value. In some examples, communication between the power delivery controller 318, the embedded controller 316, the BIOS 324, and the processor 304, or a combination thereof may be performed with an internal interface or interfaces (e.g., inter-integrated circuit (I2C) interface(s), serial peripheral interface(s) (SPI(s)), PCIe, or a combination thereof, etc.). For instance, instructions, data, information, requests, responses, etc., may be communicated over an interface or interfaces.

The processor 304 is an electronic circuit to execute an instruction or instructions. The processor 304 may be any of a processor, central processing unit (CPU), a digital signal processor (DSP), a semiconductor-based microprocessor, graphics processing unit (GPU), field-programmable gate array (FPGA), an application-specific integrated circuit (ASIC), other hardware device, or a combination thereof suitable for retrieval and execution of instructions stored in the memory 306. In some examples, the processor 304 may include multiple processors (e.g., a CPU and a GPU). The processor 304 may fetch and execute instructions stored in the memory 306. In some examples, the processor 304 may include an electronic circuit or circuits that include electronic components for performing a function or functions of the instructions.

The memory 306 is electronic circuitry to store data. The memory 306 may be any electronic, magnetic, optical, or other physical storage device that contains or stores electronic data (e.g., instructions, information, or a combination thereof). The memory 306 may be, for example, Random Access Memory (RAM), Electrically Erasable Programmable Read-Only Memory (EEPROM), a storage device, an optical disc, or a combination thereof. In some examples, the memory 306 may be volatile memory, non-volatile memory, or a combination thereof, such as Dynamic Random Access Memory (DRAM), EEPROM, magnetoresistive random-access memory (MRAM), phase change RAM (PCRAM), memristor, flash memory, or a combination thereof. In some examples, the memory 306 may be a non-transitory tangible machine-readable storage medium, where the term "non-transitory" does not encompass transitory propagating signals. In some examples, the memory 306 may include multiple devices (e.g., a RAM card and a solid-state drive (SSD)).

In some examples, the memory 306 stores machine learning model instructions 314. The machine learning model instructions 314 are instructions to execute a machine learning model, train a machine learning model, or a combination thereof. In some examples, the machine learning model instructions 314 may be a machine learning model driver. Examples of the machine learning model may include a logistic regression model, multilayer perceptron model, decision tree model, support vector machine (SVM) model, etc. In some examples, the machine learning model is a classification model to classify whether an LTR value passes or fails (e.g., whether utilizing an LTR value will result in a passing or failing operation (e.g., communication, read operation, write operation, interrupt response, etc.) with the peripheral device 310).

In some examples, the processor 304 produces, based on the information, a determination indicating whether a record of the peripheral device 310 is stored. In some examples, the determination may be produced as described in FIG. 1. For instance, the processor 304 may search a database stored in the memory 306 to determine whether the information of the peripheral device 310 was previously stored in the database.

In some examples, the processor 304 trains a machine learning model to determine a target LTR value in a case that the determination indicates that a record of the peripheral devices is not stored. In some examples, training the machine learning model may be performed as described in FIG. 1. For instance, in a case that the determination indicates that a record of the peripheral device 310 is not stored, the processor 304 may execute the machine learning model instructions 314 to train the machine learning model. The processor 304 may store the information about the peripheral device 310 in the memory 306 (e.g., in a database). In some examples, data corresponding to the peripheral device 310 may be stored in the memory 306. For instance, the device identifier, vendor identifier, trained machine learning model (e.g., boundary function f), target LTR value, failure count, or a combination thereof may be stored in the memory 306.

In some examples, the processor 304 may determine whether a failure count threshold is exceeded in a case that the determination indicates that a record of the peripheral device 310 is stored. For instance, the processor 304 may compare a failure count (stored in the memory 306, for example) to the failure count threshold to determine whether the failure count exceeds the failure count threshold. In some examples, determining whether a failure count threshold is exceeded may be performed as described in FIG. 1. In some examples, the processor 304 may train (e.g., re-train) the machine learning model in a case that the failure count threshold is exceeded. In some examples, training the machine learning model may be performed as described in FIG. 1.

In some examples, the BIOS 324 may determine whether the target LTR is less than an LTR setting. For instance, the BIOS 324 may read an LTR setting from a peripheral controller 312. A peripheral controller is circuitry to control interoperation with a peripheral device. For instance, the peripheral controller 312 may control interoperation with the peripheral device 310. In some examples, the BIOS 324 may read the LTR setting from a register(s) of the peripheral controller 312. The BIOS 324 may compare the target LTR value (determined by the processor 304, for instance) to the LTR setting (of the peripheral controller 312 corresponding to the peripheral device 310, for instance) to determine whether the target LTR value is less than the LTR setting. The BIOS 324 may select the target LTR value in a case that the target LTR value is less than the LTR setting. For instance, the BIOS 324 may write the target LTR value to the register(s) of the peripheral controller 312 at the LTR setting. In some examples, the LTR setting may be maintained in a case that the LTR value is not less than the LTR setting. The electronic device 302 (e.g., peripheral controller 312) may utilize the LTR setting to perform an operation (e.g., read/write operation(s)) between the electronic device 302 and the peripheral device 310.

Figure 4:
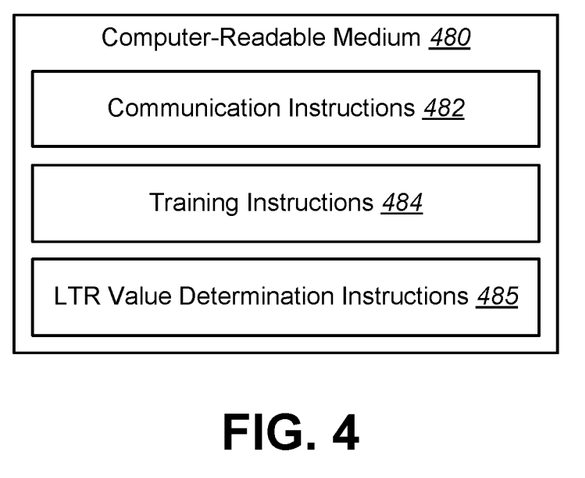
FIG. 4 is a block diagram illustrating an example of a computer-readable medium for LTR value determination.

FIG. 4 is a block diagram illustrating an example of a computer-readable medium 480 for LTR value determination. The computer-readable medium 480 is a non-transitory, tangible computer-readable medium. In some examples, the computer-readable medium 480 may be, for example, RAM, DRAM, EEPROM, MRAM, PCRAM, a storage device, an optical disc, the like, or a combination thereof. In some examples, the computer-readable medium 480 may be volatile memory, non-volatile memory, or a combination thereof. In some examples, the computer-readable medium 480 described in FIG. 4 may be an example of the memory 107 described in FIG. 1 or the memory 306 described in FIG. 3.

The computer-readable medium 480 may include data (e.g., information, instructions). In the example of FIG. 4, the computer-readable medium 480 includes communication instructions 482, training instructions 484, and LTR value determination instructions 484.

The communication instructions 482 may include instructions when executed cause a processor of an electronic device to send a read/write command to a peripheral device for a plurality of LTR values. In some examples, sending the read/write commands may be performed as described in FIG. 1, FIG. 2A, FIG. 2B, FIG. 3, FIG. 6, FIG. 7, or a combination thereof. In some examples, the computer-readable medium 480 includes instructions when executed cause the processor to determine a pass or failure indicator for the plurality of LTR values. In some examples, determining a pass or failure indicator may be performed as described in FIG. 1, FIG. 2A, FIG. 2B, FIG. 3, FIG. 6, FIG. 7, or a combination thereof.

The training instructions 484 may include instructions when executed cause the processor to train a machine learning model based on the plurality of LTR values. In some examples, training the machine learning model may be performed as described in FIG. 1, FIG. 2A, FIG. 2B, FIG. 3, FIG. 5, FIG. 6, FIG. 7, or a combination thereof.

The LTR value determination instructions 485 may include instructions when executed cause a processor of an electronic device to determine a target LTR value based on the machine learning model. In some examples, determining a target LTR value may be performed as described in FIG. 1, FIG. 3, FIG. 4, FIG. 5, FIG. 6, FIG. 7, or a combination thereof. In some examples, the computer-readable medium 480 includes instructions when executed cause the processor to store the target LTR value and the machine learning model.

Figure 5:
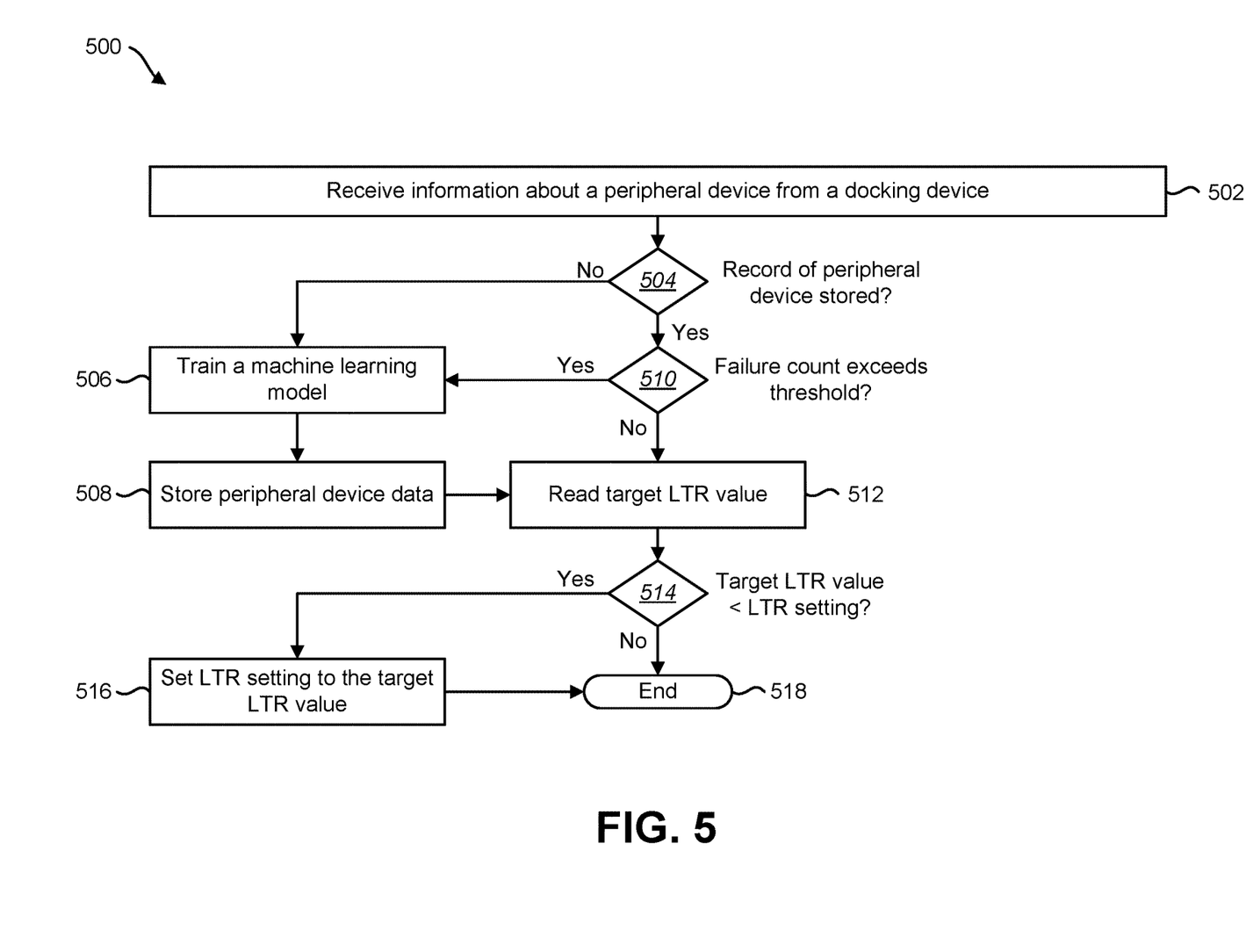
FIG. 5 is a flow diagram illustrating an example of a method for LTR value determination.

FIG. 5 is a flow diagram illustrating an example of a method 500 for LTR value determination. The method 100 or a method 500 element or elements may be performed by an apparatus (e.g., electronic device, computing device, game console, smart appliance, etc.). For example, the method 100 may be performed by the electronic device 103 described in FIG. 1 or the electronic device 302 described in FIG. 3.

At 502, an electronic device may receive information about a peripheral device from a docking device. In some examples, receiving the information may be performed as described in FIG. 1, FIG. 3, FIG. 4, or a combination thereof. For instance, a power delivery controller may receive the information. In some examples, the power delivery controller may send the information to an embedded controller, which may send the information to a BIOS. In some examples, the BIOS may store the information in memory (e.g., in a record, database, etc.).

At 504, the electronic device (e.g., processor) may determine whether a record of a peripheral device is stored. In some examples, determining whether the record of a peripheral device is stored may be performed as described in FIG. 1, FIG. 3, FIG. 4, or a combination thereof.

In a case that a record of the peripheral device is not stored, the electronic device (e.g., processor) may train a machine learning model at 506. In some examples, training the machine learning model may be performed as described in FIG. 1, FIG. 3, FIG. 4, or a combination thereof.

In a case that a record of the peripheral device is stored, the electronic device (e.g., processor) may determine whether a failure count exceeds a failure count threshold at 510. In some examples, determining whether the failure count exceeds the failure count threshold may be performed as described in FIG. 1, FIG. 3, FIG. 4, or a combination thereof. In a case that the failure count exceeds the failure count threshold, the electronic device (e.g., processor) may train a machine learning model at 506.

At 508, the electronic device may store peripheral device data. In some examples, storing peripheral device data may be performed as described in FIG. 1, FIG. 3, or a combination thereof. For instance, a device identifier, vendor identifier, trained machine learning model (e.g., boundary function f), target LTR value, failure count, or a combination thereof may be stored in memory.

At 512, the electronic device (e.g., BIOS) may read a target LTR value. For instance, the BIOS may read a target LTR value from memory (e.g., a database in memory).

At 514, the electronic device (e.g., BIOS) may determine whether a target LTR value is less than an LTR setting. In some examples, determining whether a target LTR value is less than an LTR setting may be performed as described in FIG. 1, FIG. 3, FIG. 4, or a combination thereof. In a case that the target LTR value is not less than the LTR setting, operation may end at 518 (e.g., the electronic device or BIOS may maintain the LTR setting or not modify the LTR setting).

At 516, the electronic device (e.g., BIOS) may set the LTR setting to the target LTR value. In some examples, setting the LTR setting to the target LTR value may be performed as described in FIG. 1, FIG. 3, FIG. 4, or a combination thereof. For instance, the BIOS may write the target LTR value to a PCIe root port.

Figure 6:
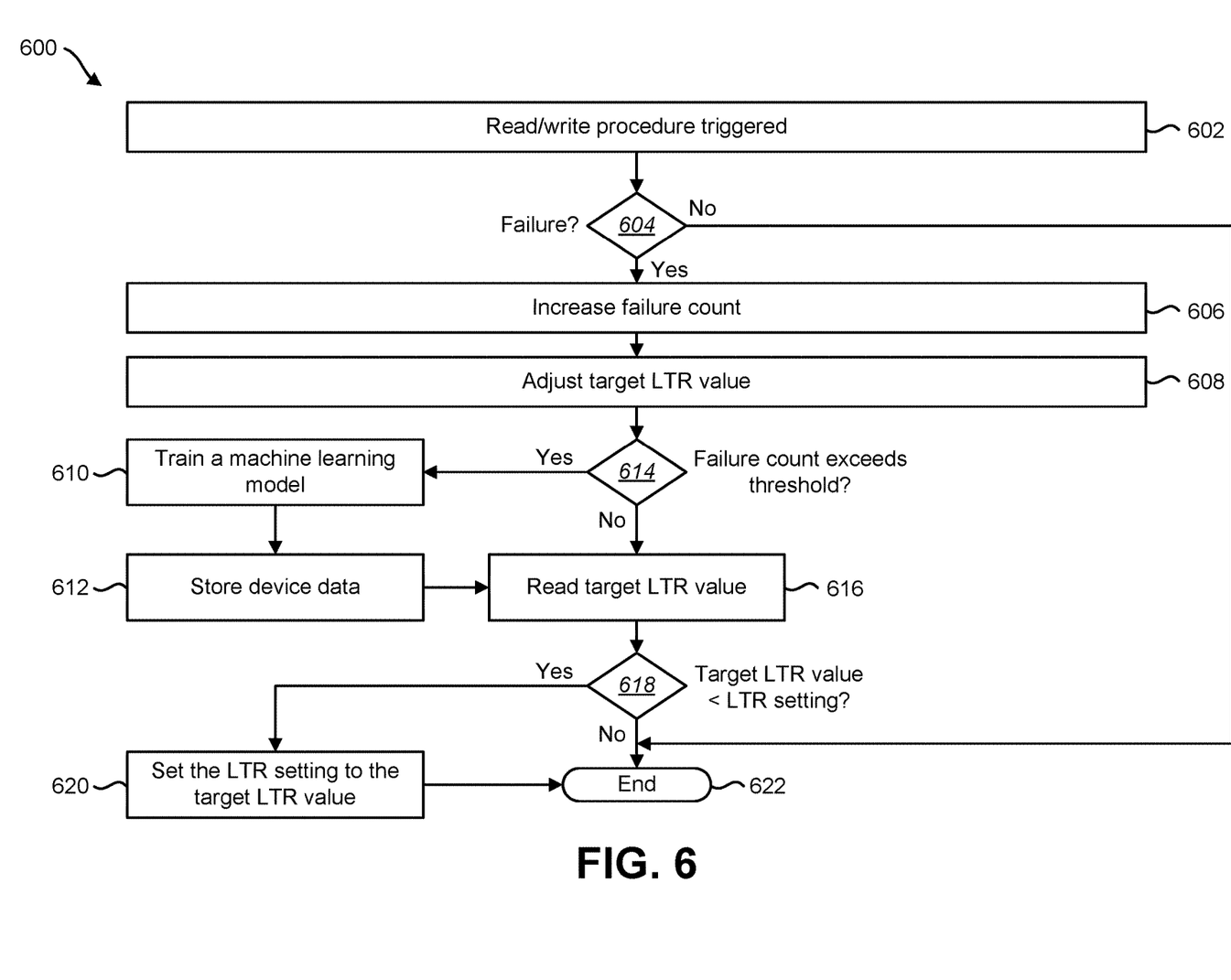
FIG. 6 is a flow diagram illustrating another example of a method for LTR value determination.

FIG. 6 is a flow diagram illustrating another example of a method 600 for LTR value determination. The method 600 or a method 600 element or elements may be performed by an apparatus (e.g., electronic device, computing device, game console, smart appliance, etc.). For example, the method 600 or an element(s) thereof may be performed by the electronic device 103 described in FIG. 1 or the electronic device 302 described in FIG. 3.

At 602, a read/write procedure is triggered. In some examples, a read/write procedure may be triggered as described in FIG. 1, FIG. 2A, FIG. 2B, FIG. 3, FIG. 4, or a combination thereof. For instance, an electronic device may trigger a read/write procedure (e.g., send a read/write command to a peripheral device) or a peripheral device may trigger the read/write procedure (e.g., send a read/write request to the electronic device).

At 604, an electronic device may determine whether a procedure (e.g., read/write procedure) failure has occurred. In some examples, determining whether a procedure failure has occurred may be performed as described in FIG. 1, FIG. 2A, FIG. 2B, FIG. 3, FIG. 4, or a combination thereof. For instance, an electronic device may determine if a read/write procedure has timed out, if a packet is dropped, etc. In a case it is determined that failure has not occurred, operation of the method 600 may end at 622. For instance, the read/write procedure may be performed without increasing a failure count, adjusting a target LTR value, etc.

At 606, the electronic device (e.g., processor) may increase (e.g., increment) a failure count. For instance, in a case that it is determined that a failure has occurred, the electronic device may increase the failure count at 606. In some examples, increasing a failure count may be performed as described in FIG. 1, FIG. 2A, FIG. 2B, FIG. 3, FIG. 4, or a combination thereof. For instance, an electronic device may increment a failure count in memory (e.g., an entry of a database corresponding to a peripheral device).

At 608, the electronic device (e.g., processor) may adjust a target LTR value. In some examples, adjusting a target LTR value may be performed as described in FIG. 1 or a combination thereof. For instance, an electronic device may adjust the target LTR value to a next smaller passing LTR value.

At 614, the electronic device (e.g., processor) may determine whether a failure count exceeds a failure count threshold. In some examples, determining whether the failure count exceeds the failure count threshold may be performed as described in FIG. 1, FIG. 3, FIG. 4, FIG. 5, or a combination thereof. In a case that the failure count exceeds the failure count threshold, the electronic device (e.g., processor) may train a machine learning model at 610. In some examples, training the machine learning model may be performed as described in FIG. 1, FIG. 3, FIG. 4, FIG. 5, or a combination thereof.

At 612, the electronic device may store peripheral device data. In some examples, storing peripheral device data may be performed as described in FIG. 1, FIG. 3, FIG. 5, or a combination thereof.

At 616, the electronic device (e.g., BIOS) may read a target LTR value. For instance, the BIOS may read a target LTR value from memory (e.g., a database in memory). In some examples, the electronic device may read the target LTR value at 616 in a case that it is determined that a failure count does not exceed the failure count threshold.

At 618, the electronic device (e.g., BIOS) may determine whether a target LTR value is less than an LTR setting. In some examples, determining whether a target LTR value is less than an LTR setting may be performed as described in FIG. 1, FIG. 3, FIG. 4, FIG. 5, or a combination thereof. In a case that it is determined that the target LTR value is not less than the LTR setting, operation may end at 622 (e.g., the electronic device or BIOS may maintain the LTR setting or not modify the LTR setting).

At 620, the electronic device (e.g., BIOS) may set the LTR setting to the target LTR value. For instance, in a case that it is determined that the target value is less than the LTR setting, the electronic device may set the LTR setting to the target LTR value at 620. In some examples, setting the LTR setting to the target LTR value may be performed as described in FIG. 1, FIG. 3, FIG. 4, FIG. 5, or a combination thereof. In some examples, the method 600 or an aspect(s) thereof may be repeated. For instance, the method 600 may be performed for a read/write procedure trigger(s).

Figure 7:
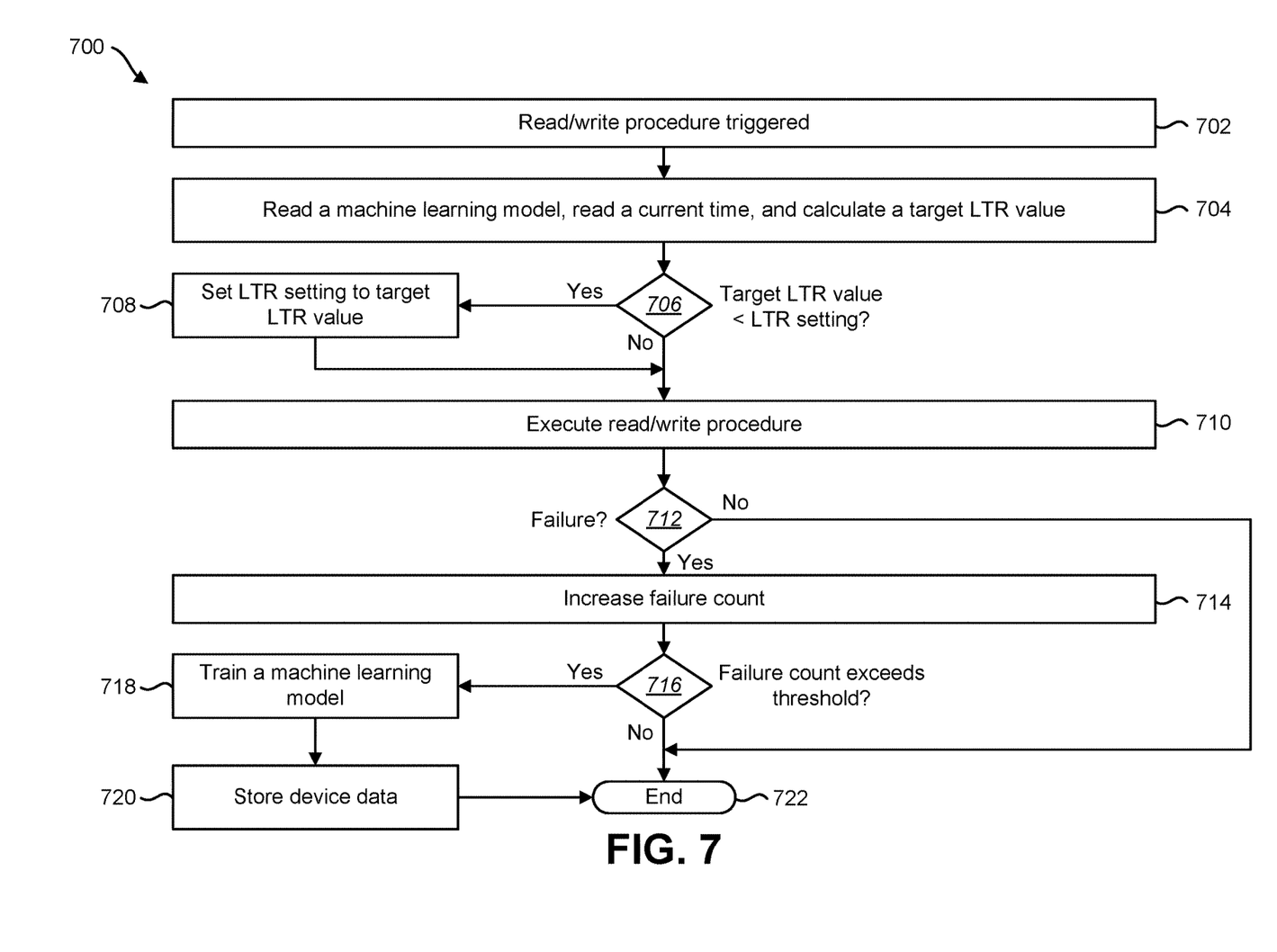
FIG. 7 is a flow diagram illustrating another example of a method for LTR value determination.

FIG. 7 is a flow diagram illustrating another example of a method 700 for LTR value determination. The method 700 or a method 700 element or elements may be performed by an apparatus (e.g., electronic device, computing device, game console, smart appliance, etc.). For example, the method 700 or an element(s) thereof may be performed by the electronic device 103 described in FIG. 1 or the electronic device 302 described in FIG. 3.

At 702, a read/write procedure is triggered. In some examples, a read/write procedure may be triggered as described in FIG. 1, FIG. 2A, FIG. 2B, FIG. 3, FIG. 4, FIG. 6, or a combination thereof. For instance, an electronic device may trigger a read/write procedure (e.g., send a read/write command to a peripheral device) or a peripheral device may trigger the read/write procedure (e.g., send a read/write request to the electronic device).

At 704, the electronic device (e.g., BIOS) may read a machine learning model (e.g., boundary function), read a current time, and calculate a target LTR value. For instance, the electronic device may read a machine learning model, read a current time (from a clock on the electronic device, for example), and calculate the target LTR value. For instance, the target LTR value may be calculated based on the machine learning model and the current time.

At 706, the electronic device (e.g., BIOS) may determine whether a target LTR value is less than an LTR setting. In some examples, determining whether a target LTR value is less than an LTR setting may be performed as described in FIG. 1, FIG. 3, FIG. 4, FIG. 5, or a combination thereof.

In a case that the target LTR value is less than the LTR setting, the electronic device (e.g., BIOS) may set the LTR setting to the target LTR value at 708. In some examples, setting the LTR setting to the target LTR value may be performed as described in FIG. 1, FIG. 3, FIG. 4, FIG. 5, or a combination thereof.

At 710, the electronic device (e.g., processor) may execute the read/write procedure. For instance, the electronic device may perform a read or write operation according to the triggered read/write procedure. In some examples, in a case that it is determined that the target LTR value is not less than the LTR setting, the electronic device may execute the read/write procedure at 710.

At 712, an electronic device may determine whether a procedure (e.g., read/write procedure) failure has occurred. In some examples, determining whether a procedure failure has occurred may be performed as described in FIG. 1, FIG. 2A, FIG. 2B, FIG. 3, FIG. 4, FIG. 6, or a combination thereof. In a case it is determined that failure has not occurred, operation of the method 700 may end at 722. For instance, the read/write procedure may be performed without increasing a failure count, etc.

In a case that a procedure failure has occurred, the electronic device (e.g., processor) may increase (e.g., increment) a failure count at 714. In some examples, increasing a failure count may be performed as described in FIG. 1, FIG. 2A, FIG. 2B, FIG. 3, FIG. 4, FIG. 6, or a combination thereof.

At 716, the electronic device (e.g., processor) may determine whether a failure count exceeds a failure count threshold. In some examples, determining whether the failure count exceeds the failure count threshold may be performed as described in FIG. 1, FIG. 3, FIG. 4, FIG. 5, FIG. 6, or a combination thereof. In a case that the failure count exceeds the failure count threshold, the electronic device (e.g., processor) may train a machine learning model at 718. In some examples, training the machine learning model may be performed as described in FIG. 1, FIG. 3, FIG. 4, FIG. 5, FIG. 6, or a combination thereof.

At 720, the electronic device may store peripheral device data. In some examples, storing peripheral device data may be performed as described in FIG. 1, FIG. 3, FIG. 5, FIG. 6, or a combination thereof. For instance, the electronic device may update a vendor identifier, device identifier, machine learning model (e.g., boundary function, time, or a combination thereof), a failure count, or a combination thereof. Operation may end at 722. In some examples, in a case that the failure count does not exceed the failure count threshold, operation may end at 722. In some examples, the method 700 or an aspect(s) thereof may be repeated. For instance, the method 700 may be performed for a read/write procedure trigger(s).

As used herein, items described with the term "or a combination thereof" may mean an item or items. For example, the phrase "A, B, C, or a combination thereof" may mean any of: A (without B and C), B (without A and C), C (without A and B), A and B (without C), B and C (without A), A and C (without B), or all of A, B, and C.

While various examples of systems and methods are described herein, the systems and methods are not limited to the examples. Variations of the examples described herein may be implemented within the scope of the disclosure. For example, operations, functions, aspects, or elements of the examples described herein may be reordered, omitted, or combined.

What is claimed is:

1. An electronic device, comprising:
a communication interface to receive information from a peripheral device; and
logic circuitry to determine a target latency tolerance reporting (LTR) value based on the information via a machine learning model,
wherein the logic circuitry is to train the machine learning model in response to a determination that the peripheral device is not indicated in a database.

2. The electronic device of claim 1, wherein the logic circuitry is to increase a failure count in response to a read/write failure.

3. The electronic device of claim 1, wherein the electronic device is connected to a docking device, and wherein the docking device is connected to the peripheral device.

4. An electronic device, comprising:
a communication interface to receive information from a peripheral device; and
logic circuitry to determine a target latency tolerance reporting (LTR) value based on the information via a machine learning model,
wherein the logic circuitry is to train the machine learning model in response to a determination that a failure count threshold is satisfied.

5. An electronic device, comprising:
a communication interface to receive information from a peripheral device; and
logic circuitry to determine a target latency tolerance reporting (LTR) value based on the information via a machine learning model,
wherein the logic circuitry is to train the machine learning model, and wherein to train the machine learning model, the logic circuitry is to send a read/write command corresponding to the peripheral device for a plurality of training LTR values to produce a training dataset.

6. The electronic device of claim 5, wherein to determine the target LTR value, the logic circuitry is to:
determine a plurality of passing LTR values based on the machine learning model; and
select the target LTR value from the plurality of passing LTR values.

7. An electronic device, comprising:
a communication interface to receive information from a peripheral device;
logic circuitry to determine a target latency tolerance reporting (LTR) value based on the information via a machine learning model; and
a basic input/output system (BIOS) to:
determine whether the target LTR value is less than an LTR setting; and
set an LTR value for a port in response to determining that the target LTR value is less than the LTR setting.

8. An electronic device, comprising:
a power delivery controller to receive information about a peripheral device from a docking device;
a processor to:
produce, based on the information, a determination indicating whether a record of the peripheral device is stored; and
train a machine learning model to determine a target latency tolerance reporting (LTR) value in a case that the determination indicates that a record of the peripheral device is not stored.

9. The electronic device of claim 8, wherein the processor is to:
determine whether a failure count threshold is exceeded in a case that the determination indicates that a record of the peripheral device is stored; and
train the machine learning model in a case that the failure count threshold is exceeded.

10. The electronic device of claim 9, further comprising a basic input/output system (BIOS) to:
determine whether the target LTR value is less than an LTR setting; and
select the target LTR value in a case that the target LTR is less than the LTR setting.

11. A non-transitory tangible computer-readable medium comprising instructions when executed cause a processor of an electronic device to:
send a read/write command to a peripheral device for a plurality of latency tolerance reporting (LTR) values;
train a machine learning model based on the plurality of LTR values; and
determine a target LTR value based on the machine learning model.

12. The non-transitory tangible computer-readable medium of claim 11, wherein the instructions when executed further cause the processor to determine a pass or failure indicator for the plurality of LTR values.

13. The non-transitory tangible computer-readable medium of claim 11, wherein the instructions when executed further cause the processor to store the target LTR value and the machine learning model.

* * * * *